United States Patent
Yamamoto et al.

(10) Patent No.: US 12,502,972 B2
(45) Date of Patent: Dec. 23, 2025

(54) ELECTRONIC CONTROL UNIT

(71) Applicant: Hitachi Astemo, Ltd., Hitachinaka (JP)

(72) Inventors: Yusuke Yamamoto, Hitachinaka (JP); Takao Fukuda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 318 days.

(21) Appl. No.: 18/022,714

(22) PCT Filed: May 7, 2021

(86) PCT No.: PCT/JP2021/017531
§ 371 (c)(1),
(2) Date: Feb. 22, 2023

(87) PCT Pub. No.: WO2022/044432
PCT Pub. Date: Mar. 3, 2022

(65) Prior Publication Data
US 2024/0034151 A1 Feb. 1, 2024

(30) Foreign Application Priority Data

Aug. 24, 2020 (JP) .................................. 2020-140687

(51) Int. Cl.
*B60L 3/00* (2019.01)
*B60L 3/04* (2006.01)
(52) U.S. Cl.
CPC ........... *B60L 3/0084* (2013.01); *B60L 3/0007* (2013.01); *B60L 3/04* (2013.01)
(58) Field of Classification Search
CPC ........ B60L 3/0084; B60L 3/0007; B60L 3/04; B60L 3/0046
See application file for complete search history.

(56) References Cited

U.S. PATENT DOCUMENTS 3,964,016 A * 6/1976 Yamada .................. B60R 21/01
180/274
5,389,824 A * 2/1995 Moroto ................. B60L 3/0007
180/283

(Continued)

FOREIGN PATENT DOCUMENTS

JP 2000-247552 A 9/2000
JP 2004-159439 A 6/2004

(Continued)

OTHER PUBLICATIONS

Extended European Search Report issued in corresponding EP Application No. 21860864.4, dated Nov. 28, 2024 (9 pages).

(Continued)

*Primary Examiner* — Thienvu V Tran
*Assistant Examiner* — Muaamar Qahtan Al-Taweel
(74) *Attorney, Agent, or Firm* — Foley & Lardner LLP

(57) ABSTRACT

Provided is an electronic control unit mounted on an electrically driven vehicle, the electronic control unit being excellent in reliability and convenience in which recovery is easy while reliably shutting off a high-voltage power supply line at the time of collision of the vehicle or failure of a power supply shutoff circuit. The electronic control unit includes: an external load switching element that drives an external load; a controller that drives the external load switching element; a shutoff transistor that shuts off connection between an internal GND and an external GND or connection between an internal power supply system and an external power supply system; a diagnosis circuit that receives, as input, a diagnosis signal of a control circuit that controls the external load by the external load switching element, and a diagnosis signal of the controller, and outputs a diagnosis result; and an output holding circuit that holds an output signal of the diagnosis circuit, wherein the shutoff transistor shuts off the connection between the internal GND (Continued)

and the external GND or the connection between the internal power supply system and the external power supply system on the basis of the signal held by the output holding circuit.

11 Claims, 8 Drawing Sheets

(56) References Cited

U.S. PATENT DOCUMENTS

| | | | | |
|---|---|---|---|---|
| 5,488,283 | A * | 1/1996 | Dougherty | H01M 10/122 |
| | | | | 320/145 |
| 8,881,860 | B2 * | 11/2014 | Cho | B60L 15/025 |
| | | | | 180/279 |
| 9,272,625 | B2 * | 3/2016 | Sonesson | B60L 50/16 |
| 9,866,011 | B2 * | 1/2018 | Lee | H02H 3/08 |
| 2017/0072837 | A1 | 3/2017 | Ueno et al. | |
| 2017/0187179 | A1 | 6/2017 | Morimoto et al. | |
| 2018/0281601 | A1 | 10/2018 | Kinoshita | |

FOREIGN PATENT DOCUMENTS

| | | |
|---|---|---|
| JP | 2017-114373 A | 6/2017 |
| JP | 2018-046646 A | 3/2018 |
| WO | WO-2015/079842 A1 | 6/2015 |

OTHER PUBLICATIONS

English Translation of International Search Report issued in corresponding International Application No. PCT/JP2021/017531, dated Jul. 13, 2021.

* cited by examiner

ELECTRONIC CONTROL UNIT

TECHNICAL FIELD

The present invention relates to a configuration of an in-vehicle electronic control unit, and particularly to a technique effective for application to an electronic control unit mounted on an electrically driven vehicle such as a hybrid electric vehicle or an electric vehicle.

BACKGROUND ART

In recent years, electrification of automobiles has progressed due to exhaust gas regulations, and a number of sales of hybrid electric vehicles (HEV) and electric vehicles (EV) has expanded.

For example, in an HEV, a high voltage power supply of about 400 V is supplied from a lithium ion battery to an inverter in order to operate a motor. When a high-voltage power supply line comes into contact with a body of a vehicle at the time of collision or the like, there is a risk of an electric shock due to touching to the vehicle.

In order to prevent such an electric shock, in the HEV, a relay is used between the lithium ion battery and a load to perform control to shut off the high-voltage power supply line except during vehicle operation.

As a background art of the present technical field, for example, there is a technique such as PTL 1. PTL 1 discloses "a power supply breaker mounted on a vehicle, the power supply breaker including: a power supply circuit having a battery, a load, and a relay; a relay control part that controls the relay to bring the battery and the load into and out of contact with each other; and a breaking mechanism that breaks a signal line provided between the relay control part and the relay to separate the battery and the load from each other at the time of vehicle collision".

CITATION LIST

Patent Literature

PTL 1: JP 2004-159439 A

SUMMARY OF INVENTION

Technical Problem

As described above, in the HEV, the relay is used between the lithium ion battery and the load. However, there is a possibility that due to a failure of a circuit component controlling the relay, or destruction of a unit due to collision of the vehicle or the like, an ON failure occurs in which the relay is stuck in an ON state and cannot be turned OFF because of a short circuit or the like between an output circuit controlling the relay and a peripheral circuit.

There is a problem that when the high-voltage power supply line comes into contact with the body or the like in a state where the relay is in an ON failure state, a person who touches the vehicle without noticing the failure gets an electric shock.

In order to solve such a problem, PTL 1 discloses a technique for forcibly shutting off the relay by cutting the high-voltage power supply line with a cutting blade when the vehicle collides.

According to PTL 1, while it is possible to reliably shut off the high-voltage power supply line at the time of collision of the vehicle, since a harness is cut off even when the relay does not have an ON failure, replacement or the like of the harness is necessary even in the case of malfunction or slight collision. In addition, a relay ON failure due to a circuit failure cannot be prevented.

Therefore, an object of the present invention is to provide an electronic control unit mounted on an electrically driven vehicle, the electronic control unit being excellent in reliability and convenience in which recovery is easy while reliably shutting off a high-voltage power supply line at the time of collision of a vehicle or failure of a power supply shutoff circuit.

Solution to Problem

In order to solve the above problem, the present invention is characterized by including: an external load switching element that drives an external load; a controller that drives the external load switching element; a shutoff transistor that shuts off connection between an internal GND and an external GND or connection between an internal power supply system and an external power supply system; a diagnosis circuit that receives, as input, a diagnosis signal of a control circuit that controls the external load by the external load switching element, and a diagnosis signal of the controller, and outputs a diagnosis result; and an output holding circuit that holds an output signal of the diagnosis circuit, wherein the shutoff transistor shuts off the connection between the internal GND and the external GND or the connection between the internal power supply system and the external power supply system on the basis of the signal held by the output holding circuit.

Advantageous Effects of Invention

According to the present invention, there can be realized an electronic control unit mounted on an electrically driven vehicle, the electronic control unit being excellent in reliability and convenience in which recovery is easy while reliably shutting off a high-voltage power supply line at the time of collision of a vehicle or failure of a power supply shutoff circuit.

Problems, configurations, and effects other than those described above will be clarified by the following description of embodiments.

DESCRIPTION OF EMBODIMENTS

Figure 1:
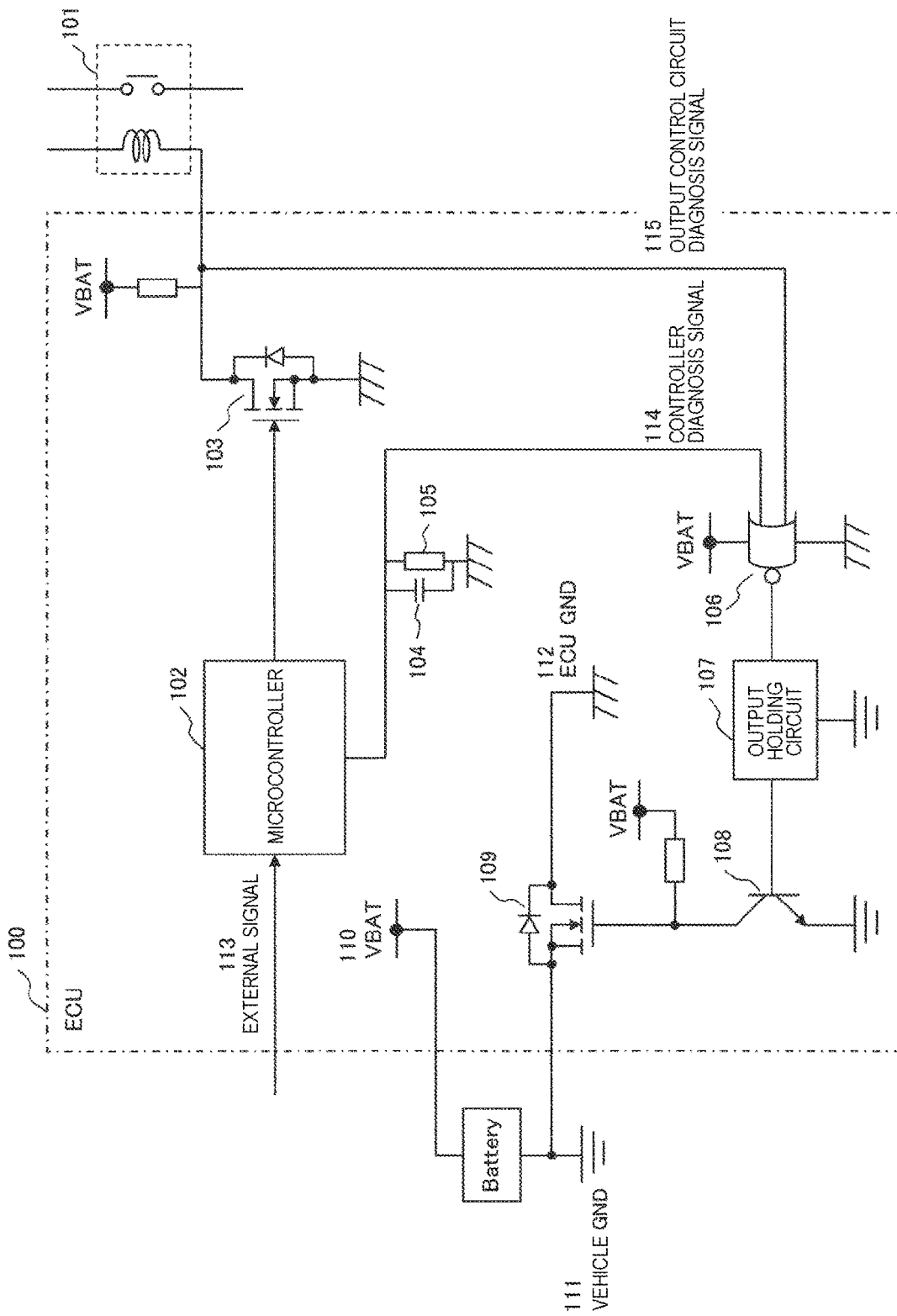
FIG. 1 is a schematic configuration diagram of an electronic control unit according to a first embodiment of the present invention.

Hereinafter, embodiments of the present invention will be described with reference to the drawings. Note that in the drawings, the same configurations are denoted by the same reference signs, and detailed description of overlapping portions is omitted.

First Embodiment

Figure 2:
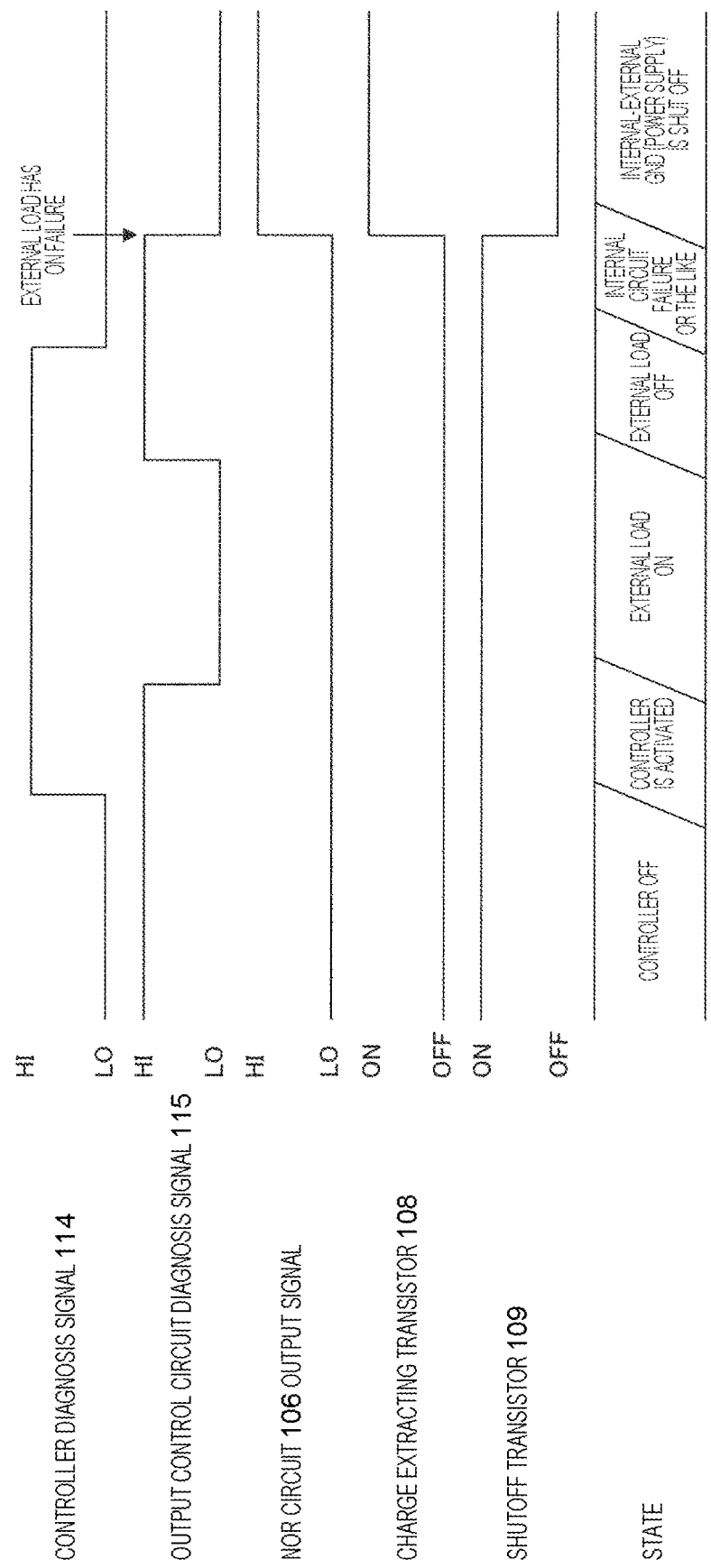
FIG. 2 is a time chart illustrating operation of the electronic control unit of FIG. 1.

An electronic control unit according to a first embodiment of the present invention will be described with reference to FIGS. 1 and 2. FIG. 1 is a schematic configuration diagram of the electronic control unit of the present embodiment. As illustrated in FIG. 1, an electronic control unit (ECU) 100 of the present embodiment includes an external load switching element 103 for driving an external load 101, and a controller 102 such as a microcontroller for driving the external load switching element 103.

A controller diagnosis signal 114 from the controller 102 is input to a NOR circuit 106 via filters such as a filter capacitor 104 and a filter resistor 105 so as to be HI at the normal time. In addition, an output control circuit diagnosis signal 115 is input to the NOR circuit 106 as a signal that becomes LO when the external load 101 is turned ON.

In addition, the electronic control unit (ECU) 100 includes an output holding circuit 107 that holds output from the NOR circuit 106, and includes a charge extracting transistor 108 that extracts a gate charge of a shutoff transistor 109. The shutoff transistor 109 has a function of shutting off an external GND (vehicle GND) 111 of a vehicle or the like and an ECU internal GND (ECU GND) 112.

While the GND inside the electronic control unit (ECU) 100 can control influence at the time of shutoff of the GND, depending on which of the vehicle GND 111 and the ECU GND 112 is set as the GND, a GND of the output holding circuit 107 and a GND of the charge extracting transistor 108 are common to the external GND (vehicle GND) 111 in order to maintain a shutoff state after the shutoff.

Operation of the electronic control unit (ECU) 100 according to the present embodiment will be described with reference to FIG. 2.

The controller diagnosis signal 114 is output as LO until the controller 102 such as the microcontroller is activated. On the other hand, since the output control circuit diagnosis signal 115 is pulled up with a battery voltage VBAT 110, a HI output is maintained. At this time, since the NOR circuit 106 outputs LO and the output holding circuit 107 also outputs LO, the charge extracting transistor 108 is put into an OFF state.

Since the shutoff transistor 109 is turned ON by the battery voltage VBAT 110, the ECU internal GND 112 is connected to the external GND 111 of the vehicle or the like.

After the activation of the controller 102, in a normal state, the controller 102 outputs the controller diagnosis signal 114 as HI. Since the NOR circuit 106 maintains the LO output, the shutoff transistor 109 maintains ON, and the ECU internal GND 112 maintains the connection with the external GND 111 of the vehicle or the like.

When the controller (microcontroller) 102 turns the external load 101 ON, the output control circuit signal 115 is output as LO. Since the controller diagnosis signal 114 is HI and the NOR circuit 106 maintains the LO output, the shutoff transistor 109 maintains ON, and the ECU internal GND 112 maintains the connection with the external GND 111 of the vehicle or the like.

Even if the controller diagnosis signal 114 becomes LO due to a failure of an internal circuit of the electronic control unit (ECU) 100, an external signal (collision signal) 113 from the outside, or the like, when the output control circuit diagnosis signal 115 is HI and the external load 101 is OFF, the NOR circuit 106 maintains the LO output, so that the shutoff transistor 109 maintains ON, and the ECU internal GND 112 maintains the connection with the external GND 111 of the vehicle or the like.

When the controller diagnosis signal 114 is LO due to a failure of an internal circuit of the electronic control unit (ECU) 100, the external signal (collision signal) 113 from the outside, or the like, and when the external load 101 has an ON failure, the output control circuit diagnosis signal 115 becomes LO, and thus, the NOR circuit 106 becomes HI. The charge extracting transistor 108 is turned ON upon reception of the HI output of the output holding circuit 107, and extracts a gate voltage of the shutoff transistor 109. Since the shutoff transistor 109 is turned OFF, the connection between the ECU internal GND 112 and the external GND 111 of the vehicle or the like is shut off.

The ECU internal GND 112 is shut off from the external GND 111 of the vehicle or the like, by which a path in which a current flows to the external GND 111 of the vehicle or the like through the external load switching element 103 is shut off in the external load 101, so that the external load 101 is shut off.

Note that the controller diagnosis signal 114 can be used not only for a failure of an internal circuit or the like but also for preventing an ON failure of the external load 101 by outputting the controller diagnosis signal 114 as an LO output upon receiving a signal from an ECU different from the electronic control unit (ECU) 100.

Since shutoff of the shutoff transistor 109 that shuts off the ECU internal GND 112 and the external GND 111 of the vehicle or the like is held by the output holding circuit 107, the holding of the output holding circuit 107 is released by once turning OFF and again turning ON the battery voltage VBAT 110 supplied to the electronic control unit (ECU) 100, so that the external load 101 can be turned ON again.

As described above, the electronic control unit (ECU) 100 of the present embodiment includes the external load switching element 103 that drives the external load 101, the controller 102 that drives the external load switching element 103, the shutoff transistor 109 that shuts off the connection between the ECU internal GND 112 and the external GND 111 of the vehicle or the like, the diagnosis circuit (NOR circuit 106) that receives, as input, the diagnosis signal (output control circuit diagnosis signal 115) of the control circuit that controls the external load 101 by the external load switching element 103, and the diagnosis signal (controller diagnosis signal 114) of the controller 102 and outputs the diagnosis result, and the output holding circuit 107 that holds the output signal of the diagnosis circuit (NOR circuit 106), and the shutoff transistor 109 shuts off the connection between the ECU internal GND 112 and the external GND 111 of the vehicle or the like on the basis of the signal held by the output holding circuit 107.

In addition, an ON failure of the external load 101 is detected on the basis of the diagnosis signal (output control circuit diagnosis signal 115) of the control circuit that controls the external load 101 by the external load switching element 103, and the diagnosis signal (controller diagnosis signal 114) of the controller 102.

As a result, it is possible to reliably turn OFF the external load 101 when the external load 101 has an ON failure at the time of a circuit failure or vehicle collision.

In addition, when the external load 101 is a relay that controls a high-voltage power supply line, it is possible to prevent an electric shock by reliably shutting off the relay even if the high-voltage power supply line comes into contact with a body.

Second Embodiment

Figure 3:
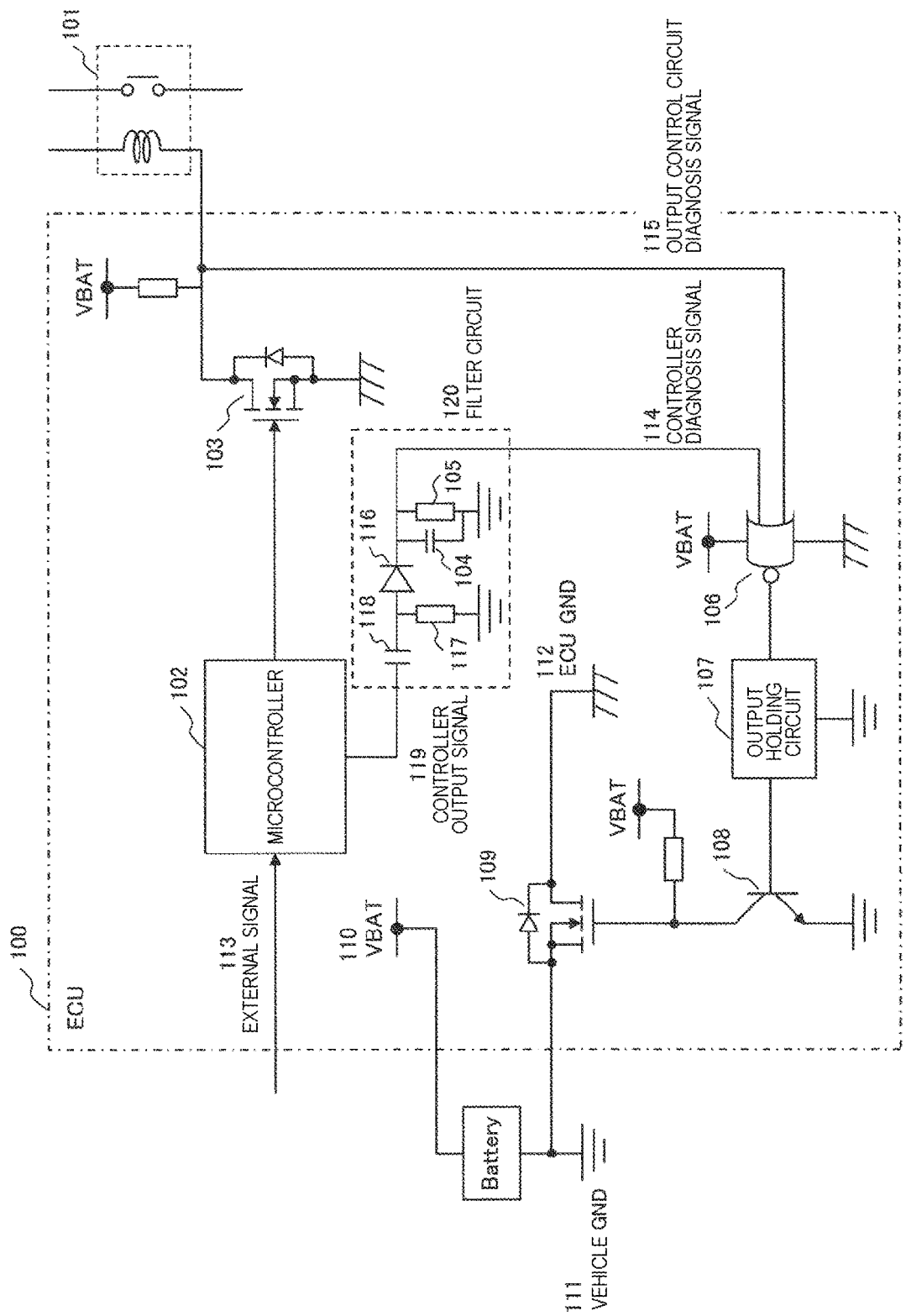
FIG. 3 is a schematic configuration diagram of an electronic control unit according to a second embodiment of the present invention.

An electronic control unit according to a second embodiment of the present invention will be described with reference to FIG. 3. FIG. 3 is a schematic configuration diagram of the electronic control unit of the present embodiment. As illustrated in FIG. 3, in an electronic control unit (ECU) 100 of the present embodiment, as compared with the first embodiment (FIG. 1), a filter circuit 120 using filter capacitors 104, 118, filter resistors 105, 117, a filter diode 116, and the like is added for the controller diagnosis signal 114. Other configurations are similar to those of the first embodiment (FIG. 1).

An object of the filter circuit 120 is to exclude a DC component by the filter capacitor 118. In a case where PWM output is input as an input of the filter circuit 120, a voltage is divided by the filter capacitor 118 and other circuits at the time of HI input of PWM, and charges are accumulated in the filter capacitor 104. At the time of LO input, charges of the filter capacitor 118 are discharged through the filter resistor 117. Since the charges of the filter capacitor 104 are limited to the filter diode 116, no charge is discharged from the filter resistor 117. Filter output becomes HI output by repetition of HI and LO.

A controller output signal 119 performs the PWM output in a normal state. The controller diagnosis signal 114 becomes HI through the filter circuit 120.

When the controller output signal 119 is fixed to LO output or to HI output, the filter circuit 120 causes the controller diagnosis signal 114 to be LO.

Even if the controller output signal 119 is fixed to the HI output due to collision of the vehicle or the like, the controller diagnosis signal 114 becomes LO according to the configuration of the present embodiment. Therefore, when the external load 101 has an ON failure, it is possible to shut off the signal.

As described above, the electronic control unit (ECU) 100 of the present embodiment includes the filter circuit 120 configured of the filter capacitors 104, 118, the filter resistors 105, 117, and the filter diode 116, and the filter circuit 120 is connected between the controller 102 and the diagnosis circuit (NOR circuit 106). The PWM output from the controller 102 is transmitted via the filter circuit 120 to exclude the DC component output from the controller 102, and is input to the diagnosis circuit (NOR circuit 106) as the diagnosis signal (controller diagnosis signal 114) of the controller 102.

In addition, by adjusting a time constant by the filter capacitors 104, 118 and the filter resistors 105, 117 of the filter circuit 120, time from stop of the PWM output from the controller 102 to the shutoff of the connection between the ECU internal GND 112 and the external GND 111 of the vehicle or the like is controlled.

By changing resistance values of the resistors and capacitance values of the capacitors configuring the filter circuit 120, it is possible to change timing when the controller diagnosis signal 114 is set to HI and LO. Therefore, it is possible to adjust timing when the ECU internal GND 112 and the external GND 111 of the vehicle or the like are shut off.

Third Embodiment

Figure 4:
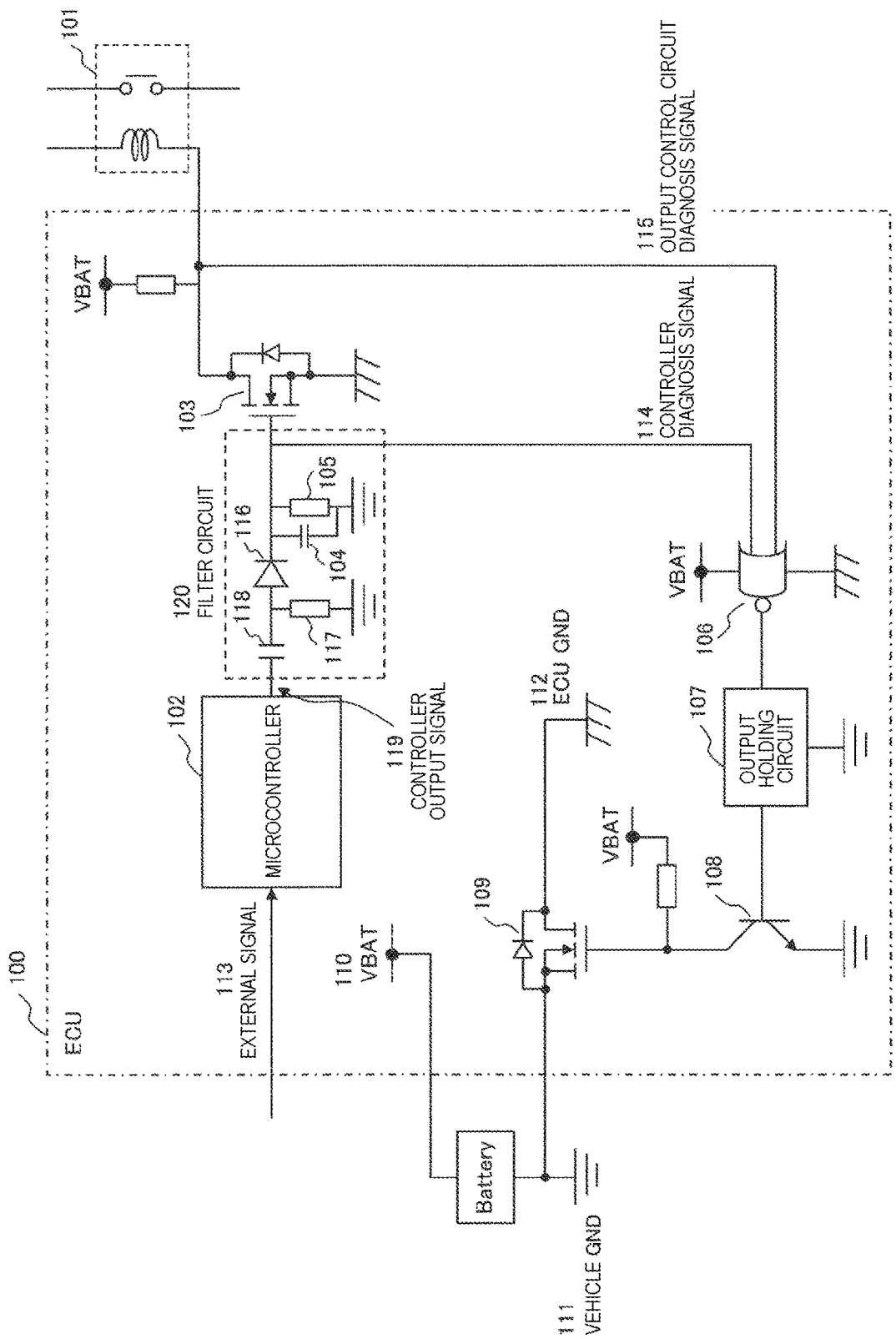
FIG. 4 is a schematic configuration diagram of an electronic control unit according to a third embodiment of the present invention.

An electronic control unit according to a third embodiment of the present invention will be described with reference to FIG. 4. FIG. 4 is a schematic configuration diagram of the electronic control unit according to the present embodiment. As illustrate in FIG. 4, in an electronic control unit (ECU) 100 of the present embodiment, as compared with the first embodiment (FIG. 1), the filter circuit 120 is added between the controller 102 such as a microcontroller and the external load switching element 103. Other configurations are similar to those of the first embodiment (FIG. 1).

As illustrated in FIG. 4, the electronic control unit (ECU) 100 of the present embodiment includes the filter circuit 120 configured of the filter capacitors 104, 118, the filter resistors 105, 117, and the filter diode 116, and the filter circuit 120 is connected between the controller 102 and the external load switching element 103.

By performing a PWM output from the controller 102, a gate voltage of the external load switching element 103 becomes HI, the external load switching element 103 is turned ON, and the external load 101 can be turned ON.

Even if the controller output signal 119 is fixed to the HI output due to a failure of an internal circuit of the electronic control unit (ECU) 100 or the like, the external load switching element 103 is not turned ON, so that it is possible to prevent the external load 101 from having an ON failure.

In addition, when the controller 102 does not control the external load switching element 103, the output of the controller diagnosis signal 114 becomes LO. Therefore, when the external load 101 has an ON failure and the output control circuit diagnosis signal 115 becomes LO, the shutoff transistor 109 is turned OFF, so that the current path of the external load 101 is shut off, and the ON failure of the external load 101 can be prevented.

Fourth Embodiment

Figure 5:
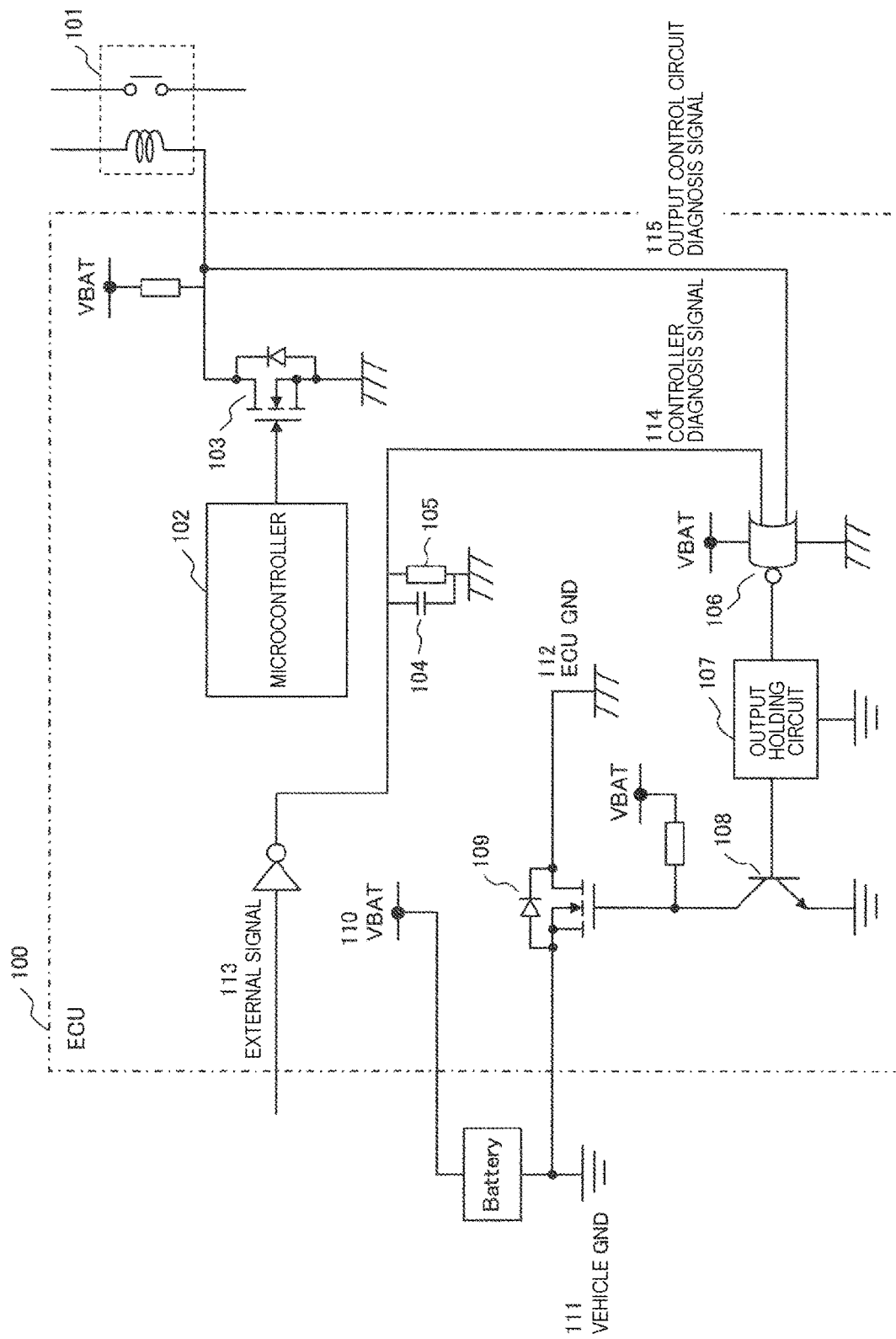
FIG. 5 is a schematic configuration diagram of an electronic control unit according to a fourth embodiment of the present invention.

An electronic control unit according to a fourth embodiment of the present invention will be described with reference to FIG. 5. FIG. 5 is a schematic configuration diagram of the electronic control unit according to the present embodiment. As illustrated in FIG. 5, as compared with the first embodiment (FIG. 1), an electronic control unit (ECU) 100 of the present embodiment directly inputs the controller diagnosis signal 114 from an external signal of the electronic control unit (ECU) 100 instead of the output from the controller 102.

Note that the controller diagnosis signal 114 may be configured to be input to the NOR circuit 106 via the filter circuit 120 as in the second embodiment (FIG. 3).

As described above, the electronic control unit (ECU) 100 of the present embodiment uses the external signal 113 (for example, vehicle collision signal) input from the outside as the diagnosis signal (controller diagnosis signal 114) of the controller 102.

An external controller (not illustrated) of the electronic control unit (ECU) 100 can forcibly turn OFF an ON state of the external load 101.

Fifth Embodiment

Figure 6:
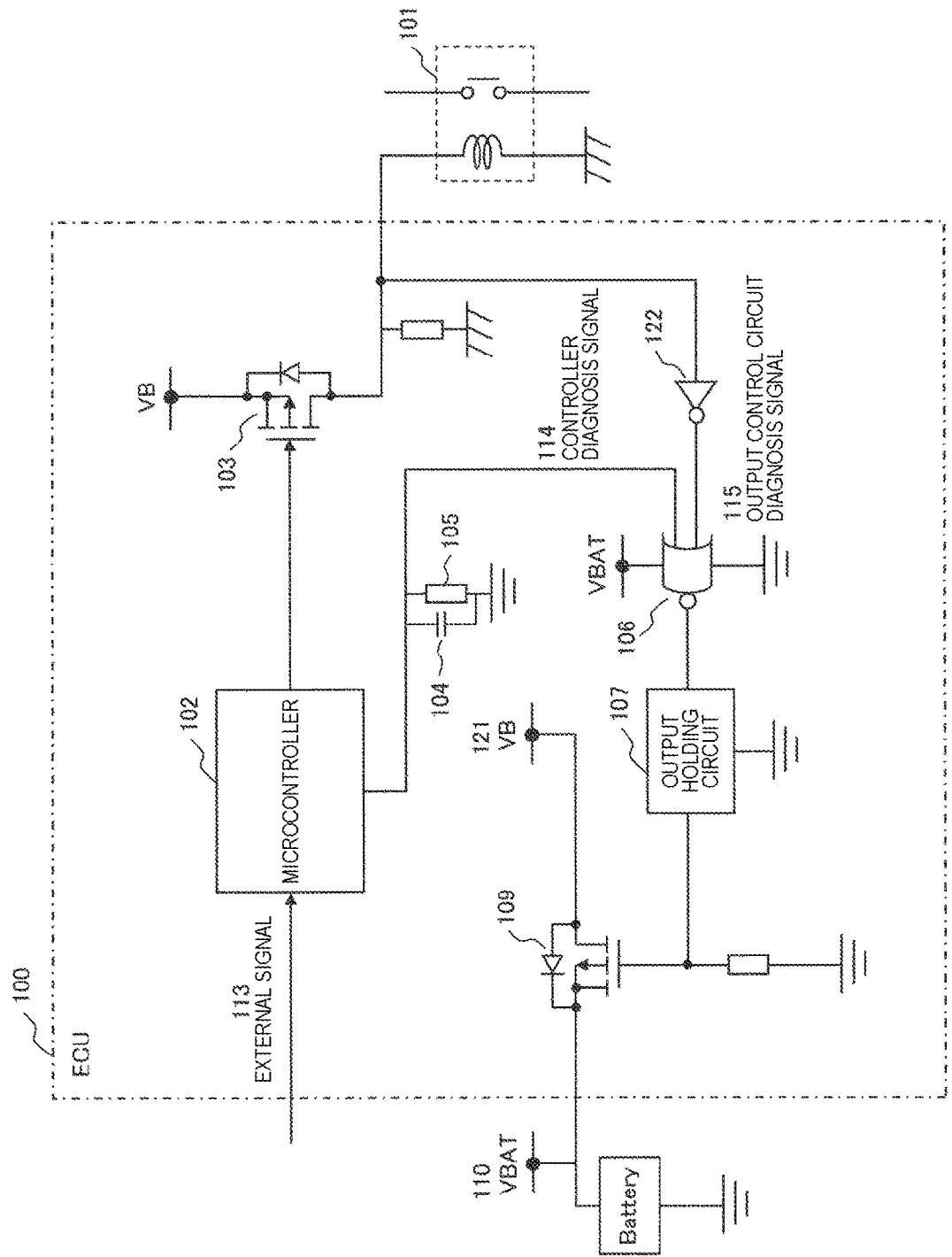
FIG. 6 is a schematic configuration diagram of an electronic control unit according to a fifth embodiment of the present invention.

An electronic control unit according to a fifth embodiment of the present invention will be described with reference to FIG. 6. FIG. 6 is a schematic configuration diagram of the electronic control unit according to the present embodiment.

In each of the first to fourth embodiments, while the external load 101 is configured such that a current flows to the external GND 111 of the vehicle or the like through the external load switching element 103, as illustrated in FIG. 6, an electronic control unit (ECU) 100 of the present embodiment is a system for controlling the external load 101 by supplying an ECU power supply VB 121 of the electronic control unit (ECU) 100 to the external load 101.

Since the ECU power supply VB 121 is supplied to the external load 101 when the external load switching element 103 is turned ON, the output control circuit diagnosis signal 115 becomes LO by a NOT circuit 122. When the control circuit diagnosis signal 114 is LO, the NOR circuit 106 is HI.

Note that the controller diagnosis signal 114 may be configured to use the external signal 113 as in the fourth embodiment.

Since HI input of the NOR circuit 106 is held by the output holding circuit 107, the shutoff transistor 109 is turned OFF, so that the connection between the battery voltage VBAT 110 and the ECU power supply VB 121 is shut off. Since the output of the external load 101 is shut off by shutting off the power supply of the ECU power supply VB 121, the external load 101 is shut off.

As illustrated in FIG. 6, in the electronic control unit (ECU) 100 of the present embodiment, the diagnosis circuit is the NOT circuit 122 and the NOR circuit 106, the diagnosis signal (output control circuit diagnosis signal 115) of the control circuit that controls the external load 101 to an internal power supply voltage (ECU power supply VB 121) by the external load switching element 103 is input to the NOR circuit 106 via the NOT circuit 122, the diagnosis signal (controller diagnosis signal 114) of the controller 102 is input to the NOR circuit 106, and the connection between the internal power supply system (ECU power supply VB 121) and the external power supply system (battery voltage VBAT 110) is shut off by the shutoff transistor 109 on the basis of the output signal of the NOR circuit 106 held by the output holding circuit 107.

Sixth Embodiment

Figure 7:
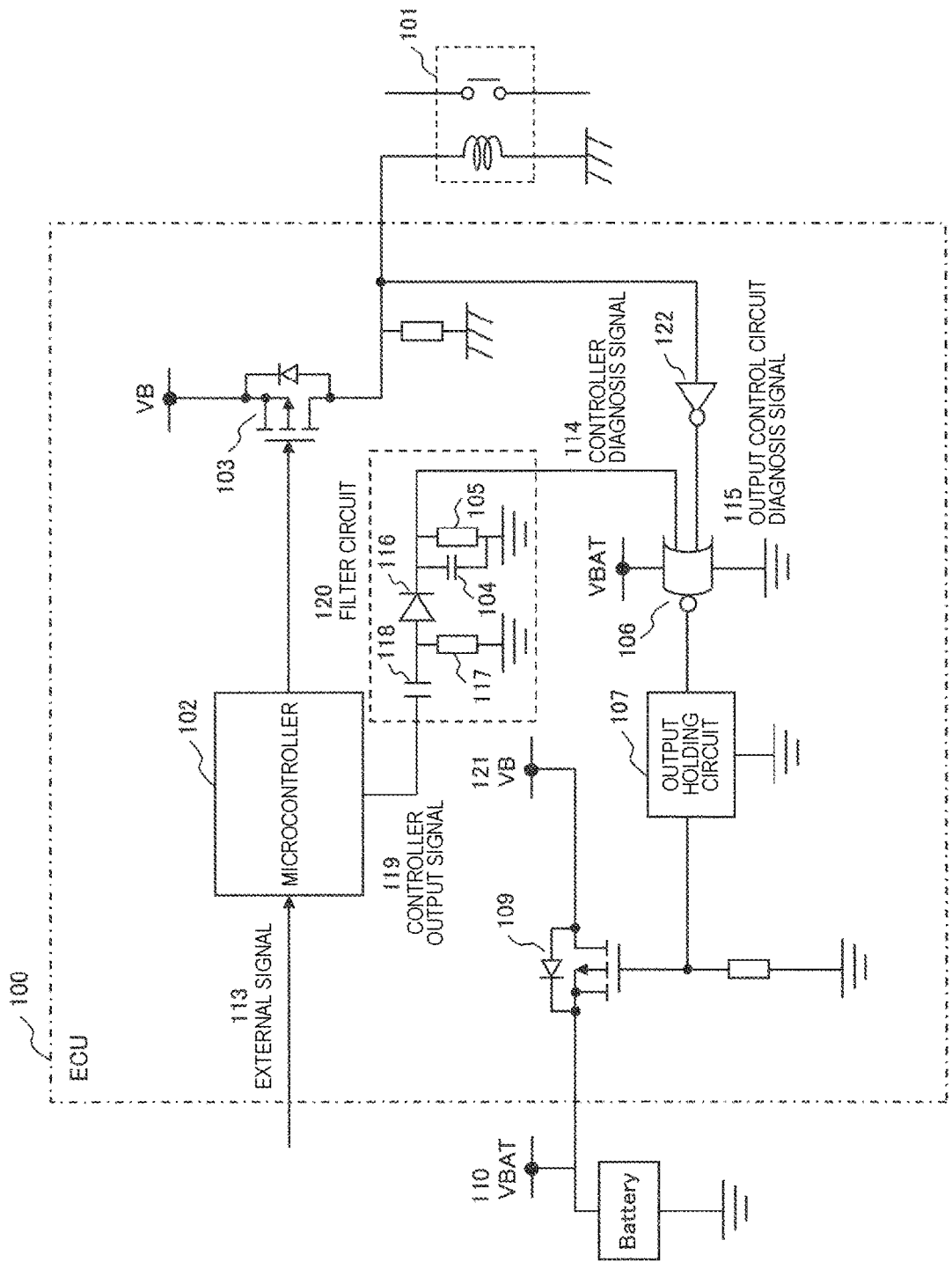
FIG. 7 is a schematic configuration diagram of an electronic control unit according to a sixth embodiment of the present invention.

An electronic control unit according to a sixth embodiment of the present invention will be described with reference to FIG. 7. FIG. 7 is a schematic configuration diagram of the electronic control unit according to the present embodiment. As illustrated in FIG. 7, in an electronic control unit (ECU) 100 of the present embodiment, as compared with the fifth embodiment (FIG. 6), the filter circuit 120 using the filter capacitors 104, 118, the filter resistors 105, 117, the filter diode 116, and the like is added for the controller diagnosis signal 114. Other configurations are similar to those of the fifth embodiment (FIG. 6).

As illustrated in FIG. 7, the electronic control unit (ECU) 100 of the present embodiment includes the filter circuit 120 configured of filter capacitors 104, 118, filter resistors 105, 117, and the filter diode 116, and PWM output from the controller 102 is transmitted via the filter circuit 120 to exclude a DC component output from the controller 102, and is input to the NOR circuit 106 as the diagnosis signal (controller diagnosis signal 114) of the controller 102.

Even if the controller output signal 119 is fixed to the HI output due to collision of the vehicle or the like, the controller diagnosis signal 114 becomes LO according to the method of the present embodiment. Therefore, when the external load 101 has an ON failure, it is possible to shutoff the signal.

Seventh Embodiment

Figure 8:
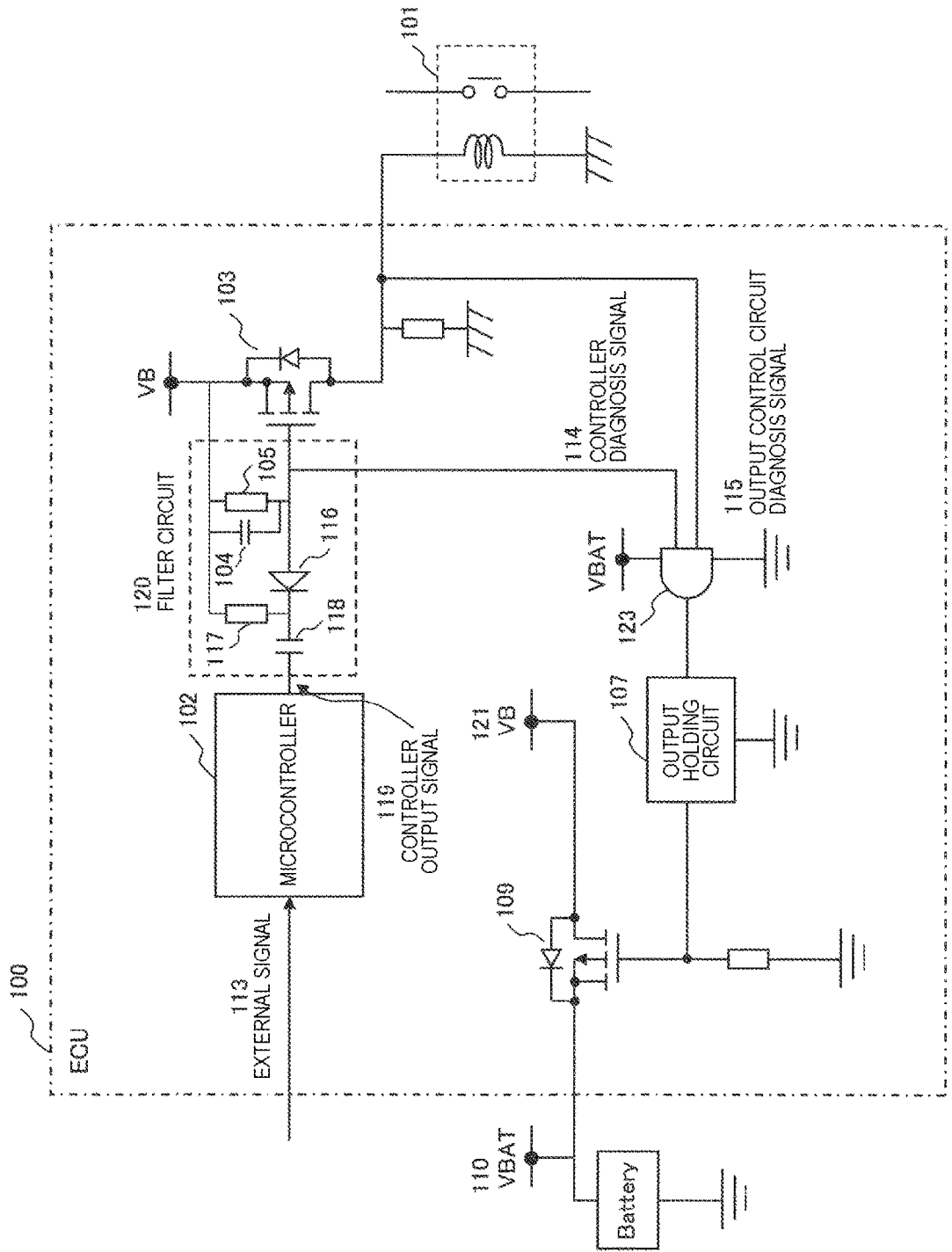
FIG. 8 is a schematic configuration diagram of an electronic control unit according to a seventh embodiment of the present embodiment.

An electronic control unit according to a seventh embodiment of the present invention will be described with reference to FIG. 8. FIG. 8 is a schematic configuration diagram of the electronic control unit according to the present embodiment. As illustrate in FIG. 8, in an electronic control unit (ECU) 100 of the present embodiment, as compared with the fifth embodiment (FIG. 6), the filter circuit 120 is added between the controller 102 such as a microcontroller and the external load switching element 103. In addition, an AND circuit 123 is connected instead of the NOR circuit 106 and the NOT circuit 122 of the fifth embodiment (FIG. 6). Other configurations are similar to those of the fifth embodiment (FIG. 6).

As illustrated in FIG. 8, the electronic control unit (ECU) 100 of the present embodiment includes the filter circuit 120 configured of the filter capacitors 104, 118, the filter resistors 105, 117, and the filter diode 116. The filter circuit 120 is connected between the controller 102 and the external load switching element 103. The diagnosis circuit is the AND circuit 123. The PWM output from the controller 102 is transmitted via the filter circuit 120 to exclude a DC component output from the controller 102, and is input to the AND circuit 123 as the diagnosis signal (controller diagnosis signal 114) of the controller 102. The shutoff transistor 109 shuts off connection between the internal power supply system (ECU power supply VB 121) and the external power supply system (battery voltage VBAT 110) on the basis of an output signal of the AND circuit 123 held by the output holding circuit 107.

By performing the PWM output from the controller output signal 119, the gate voltage of the external load switching element 103 becomes LO, the external load switching element 103 is turned ON, and the external load 101 can be turned ON.

Even if the controller output signal 119 is fixed to the LO output or the HI output due to a failure of an internal circuit of the electronic control unit (ECU) 100 or the like, the external load switching element 103 is not turned ON, so that it is possible to prevent the external load 101 from having an ON failure.

In addition, when the controller 102 does not control the external load switching element 103, the output of the controller diagnosis signal 114 becomes LO. Therefore, when the external load 101 has an ON failure and the output control circuit diagnosis signal 115 becomes HI, the AND circuit 123 performs HI output, the output holding circuit 107 holds the HI output, and the shutoff transistor 109 is turned OFF, so that the current path of the external load 101 is shut off, and the ON failure of the external load 101 can be prevented.

Note that, as the diagnosis circuit (the NOR circuit 106, the NOT circuit 122, the AND circuit 123) and the output holding circuit 107 described in each of the above embodiments, it is desirable to use a semiconductor element in which at least these circuits are formed on the same semiconductor chip. By forming the diagnosis circuit and the output holding circuit 107 on the same semiconductor chip, wiring delay between both the circuits is eliminated, and the shutoff transistor 109 can be operated without delay.

In addition, the present invention is not limited to the above-described embodiments, but includes various modifications. For example, the above-described embodiments have been described in detail in order to facilitate understanding of the present invention, and are not necessarily limited to those including all the described configurations. In addition, a part of the configuration of one embodiment can be replaced with a configuration of another embodiment, and the configuration of one embodiment can be added to a configuration of another embodiment. Moreover, with respect to a part of the configuration of each of the embodiment, addition, deletion, or replacement of another configuration can be made.

REFERENCE SINGS LIST 100 electronic control unit (ECU)
101 external load
102 controller (such as a microcontroller)
103 external load switching element
104 filter capacitor
105 filter resistor
106 NOR circuit
107 output holding circuit
108 charge extracting transistor
109 shutoff transistor
110 battery voltage (VBAT)
111 external GND of vehicle or the like (vehicle GND)
112 ECU internal GND (ECU GND)
113 external signal (collision signal)
114 controller diagnosis signal
115 output control circuit diagnosis signal
116 filter diode
117 filter resistor
118 filter capacitor
119 controller output signal (of a microcontroller or the like)
120 filter circuit
121 ECU power supply (VB)
122 NOT circuit
123 AND circuit

The invention claimed is:

1. An electronic control unit comprising:
an external load switching element that drives an external load;
a controller that drives the external load switching element;
a shutoff transistor that shuts off connection between an internal GND and an external GND or connection between an internal power supply system and an external power supply system;
a diagnosis circuit that receives, as input, a diagnosis signal of a control circuit that controls the external load by the external load switching element and a diagnosis signal of the controller, and outputs a diagnosis result; and
an output holding circuit that holds an output signal of the diagnosis circuit, wherein the shutoff transistor shuts off the connection between the internal GND and the external GND or the connection between the internal power supply system and the external power supply system based on the signal held by the output holding circuit,
wherein
the diagnosis circuit is a NOR circuit,
the diagnosis signal of the control circuit that controls the external load to a GND by the external load switching element, and the diagnosis signal of the controller are input to the NOR circuit, and
the shutoff transistor shuts off the connection between the internal GND and the external GND based on an output signal of the NOR circuit held by the output holding circuit.

2. The electronic control unit according to claim 1, wherein an ON failure of the external load is detected based on the diagnosis signal of the control circuit that controls the external load by the external load switching element, and the diagnosis signal of the controller.

3. The electronic control unit according to claim 1, comprising a filter circuit configured of a capacitor, a resistor, and a diode, wherein pulse width modulation (PWM) output from the controller is transmitted via the filter circuit to exclude a DC component output from the controller, and is input to the diagnosis circuit as the diagnosis signal of the controller.

4. The electronic control unit according to claim 3, wherein by adjusting a time constant by the capacitor and the resistor of the filter circuit, time from stop of the PWM output from the controller to shutoff of the connection between the internal GND and the external GND or the connection between the internal power supply system and the external power supply system is controlled.

5. The electronic control unit according to claim 3, wherein the filter circuit is connected between the controller and the diagnosis circuit or between the controller and the external load switching element.

6. The electronic control unit according to claim 1, wherein an external signal input from an outside is used as the diagnosis signal of the controller.

7. The electronic control unit according to claim 6, wherein the external signal is a vehicle collision signal.

8. An electronic control unit comprising:
an external load switching element that drives an external load;
a controller that drives the external load switching element;
a shutoff transistor that shuts off connection between an internal GND and an external GND or connection between an internal power supply system and an external power supply system;
a diagnosis circuit that receives, as input, a diagnosis signal of a control circuit that controls the external load by the external load switching element and a diagnosis signal of the controller, and outputs a diagnosis result; and
an output holding circuit that holds an output signal of the diagnosis circuit, wherein the shutoff transistor shuts off the connection between the internal GND and the external GND or the connection between the internal power supply system and the external power supply system based on the signal held by the output holding circuit,
wherein
the diagnosis circuit is a NOT circuit and a NOR circuit,
the diagnosis signal of the control circuit that controls the external load to an internal power supply voltage by the external load switching element is input to the NOR circuit via the NOT circuit, and the diagnosis signal of the controller is input to the NOR circuit, and
the shutoff transistor shuts off the connection between the internal power supply system and the external power supply system based on an output signal of the NOR circuit held by the output holding circuit.

9. The electronic control unit according to claim 8, comprising a filter circuit configured of a capacitor, a resistor, and a diode, wherein PWM output from the controller is transmitted via the filter circuit to exclude a DC component output from the controller, and is input to the NOR circuit as the diagnosis signal of the controller.

10. An electronic control unit comprising:
an external load switching element that drives an external load;
a controller that drives the external load switching element;
a shutoff transistor that shuts off connection between an internal GND and an external GND or connection between an internal power supply system and an external power supply system;
a diagnosis circuit that receives, as input, a diagnosis signal of a control circuit that controls the external load by the external load switching element and a diagnosis signal of the controller, and outputs a diagnosis result;
an output holding circuit that holds an output signal of the diagnosis circuit, wherein the shutoff transistor shuts off the connection between the internal GND and the external GND or the connection between the internal power supply system and the external power supply system based on the signal held by the output holding circuit; and
a filter circuit configured of a capacitor, a resistor, and a diode,
wherein
the filter circuit is connected between the controller and the external load switching element, and the diagnosis circuit is an AND circuit,
PWM output from the controller is transmitted via the filter circuit to exclude a DC component output from the controller, and is input to the AND circuit as the diagnosis signal of the controller, and
the shutoff transistor shuts off the connection between the internal power supply system and the external power supply system based on an output signal of the AND circuit held by the output holding circuit.

11. The electronic control unit according to claim 1, wherein at least the diagnosis circuit and the output holding circuit are formed on a same semiconductor chip.

* * * * *